UNITED STATES PATENT OFFICE.

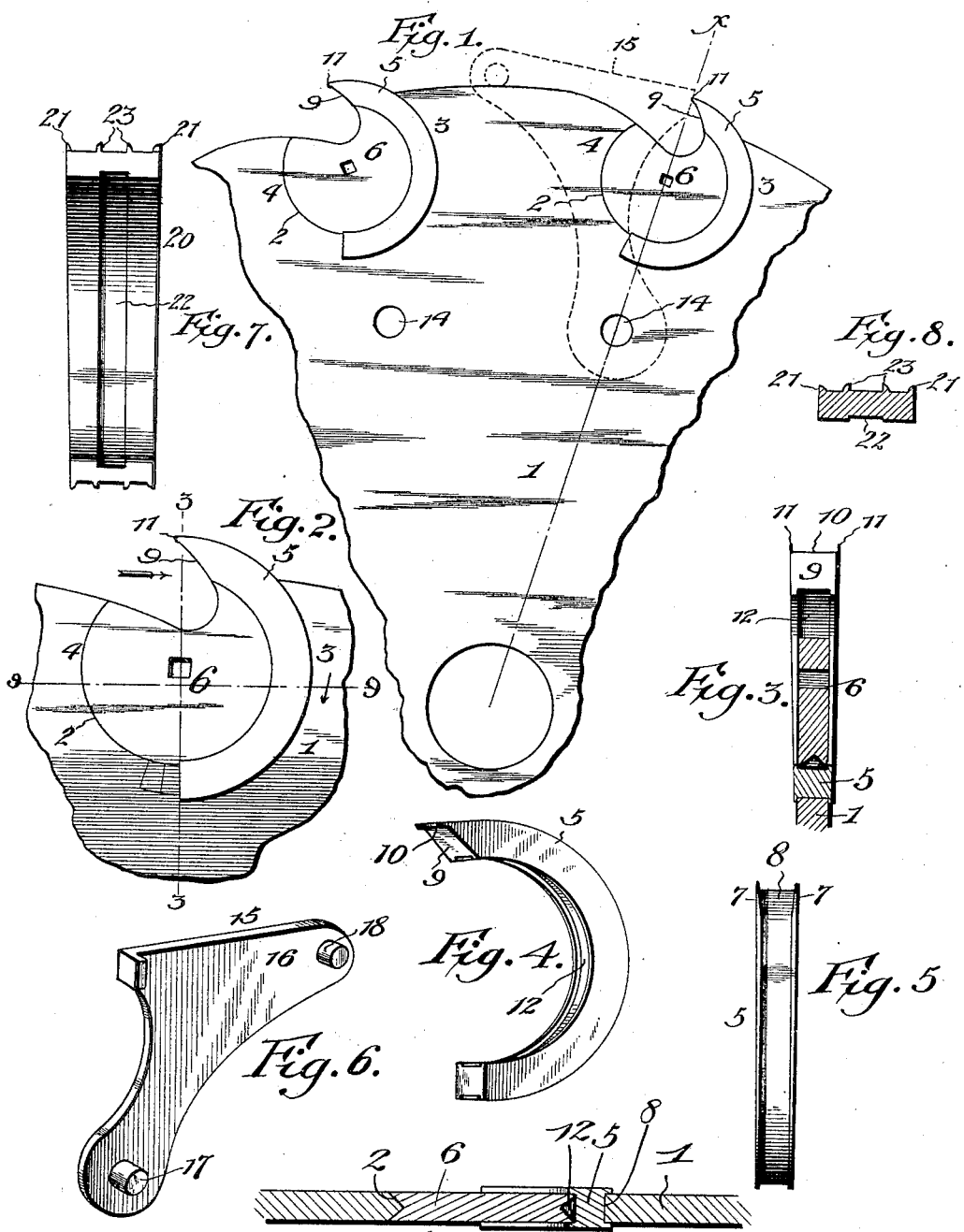

JOHN H. JEWETT, OF INGALLS, MICHIGAN.

SAW.

SPECIFICATION forming part of Letters Patent No. 630,234, dated August 1, 1899.

Application filed August 30, 1898. Serial No. 689,833. (No model.)

*To all whom it may concern:*

Be it known that I, JOHN H. JEWETT, a citizen of the United States, residing at Ingalls, in the county of Menominee and State of Michigan, have invented a new and useful Saw, of which the following is a specification.

My invention relates to improvements in insertible saw-teeth of that class designed for use primarily on circular saws; and the primary object of the invention is to provide an improved construction of the tooth or bit especially designed for service in a cut-off saw and which requires neither setting nor swaging for its proper application and which may be fitted in a common thin saw to be used as an ordinary ripping-saw.

A further object of the invention is to provide an improved saw tooth or bit in which preliminary cutters are employed to project in advance of the primary cutting edge of the tooth or bit, whereby the operation of cutting is performed easily and quickly with less power for the running of the saw.

With these ends in view the invention consists of a saw-tooth which embodies as integral parts of its structure a transverse chisel edge at the working end of the tooth and preliminary cutters situated along the sides of the back of the tooth and arranged to project in advance of the chisel edge, whereby any tendency of the chisel edge to cut in advance of the preliminary side cutters is wholly obviated notwithstanding wear of the tooth or bit.

To enable others to understand the invention, I have illustrated the same in the accompanying drawings, forming a part of this specification, and in which—

Figure 1 is a side elevation of a portion of a rotary saw with a series of my improved bits or teeth applied thereto and illustrating by dotted lines means to gage the proper adjustment of each tooth with relation to the peripheral working edge of the saw edge. Fig. 2 is an enlarged view, in side elevation, of one of the teeth or bits, its locking means, and a fragment of the saw-blade. Fig. 3 is a transverse sectional elevation on the plane indicated by the dotted line 3 3 of Fig. 2 looking in the direction of the arrow at the working end of the insertible bit or tooth. Fig. 4 is a detail view in perspective of the insertible tooth removed from the saw-blade and its locking device. Fig. 5 is an elevation of the insertible bit or tooth looking at the rear face thereof. Fig. 6 is a detail view in perspective of the gage by which the proper adjustment of the tooth in the saw-blade may be effected. Figs. 7 and 8 are views of an insertible tooth for use in saw-blades of greater thickness than the tooth shown by Figs. 2 to 5, inclusive. Fig. 9 is a sectional view on the plane at right angles to Fig. 3 and indicated by the dotted line 9 9 of Fig. 2 to illustrate the interlocking connection between the insertible tooth and the locking-block.

Like numerals of reference denote corresponding parts in each of the several figures of the drawings.

1 designates a part of a rotary or circular saw-blade which is provided with a series of recesses 2. Each recess is in the form of a segment of a circle, and it has two sides 3 4, the side 3 being of greater diameter than the side 4. The side 3 of the recess is bounded by a flat annular edge free from any protuberance or depression, while the side 4 has a V-shaped rib or tongue to fit into a correspondingly-shaped groove or channel in one part of an eccentric locking-block 6. The interlocking connection between the block 6 and the insertible tooth or bit is represented more clearly by Fig. 9.

5 designates my improved tooth or bit, a plurality of which are seated in the recesses 2, adjacent to the working edge of the saw-blade. Each bit or tooth 5 is a segment of a circle of proper size to fit the flat annular edge or side 3 of one recess in the saw-blade. In my invention I construct the insertible tooth or bit in a peculiar form to adapt it for seating in the kerf side 3 of the recess without necessitating any special construction of said part 3 of the recess. The insertible tooth or bit is provided on its rear or neutral edge with protruding flanges or ribs 7, which are arranged at the sides of the bit or tooth and lie parallel to each other to form between themselves a segmental channel or groove 8. The working end of the tooth or bit is beveled from its outer circumference between the flanges or ribs, as at 9, for the purpose of forming the chisel edge 10 at the working end of said bit or tooth. The side segmental flanges or ribs of the tooth project at their front extremities in advance of the chisel edge of the tooth or bit, and these projecting edges of said flanges constitute the preliminary cutters 11.

In my tooth or bit the chisel edge and the preliminary cutters form integral elements of the structure and they constitute an improved cutting edge by which the fibers of the wood are severed by the preliminary cutters in advance of the chisel edge engaging with the wood or work for the purpose of making a primary incision or cut therein. I attach especial importance to the construction of the tooth with the chisel edge at its working end and the preliminary cutters projecting in advance of the chisel edge and lying on opposite sides of the same because such construction wholly obviates any liability of the bit or cutter to have its chisel edge operate on the work in advance of the preliminary cutters.

My improved tooth is seated in the saw-blade by fitting its heel against the flat segmental side 3 of the recess and slipping it endwise into position therein. This adjustment of the tooth causes the flat edge 3 to occupy the channel or groove between the side flanges or ribs of the tooth, and said flanges or ribs are thus caused to embrace the sides or faces of the saw-blade, thereby holding the tooth or bit in position against any tendency to lateral or sidewise displacement.

From the foregoing description it will be apparent that the ribs or flanges on the bit serve a twofold purpose—first, as a means for holding the bit against sidewise displacement within the recess of the saw-blade, and, second, the terminals of the ribs project in front of the chisel edge to form the preliminary cutters heretofore described.

I construct the tooth or bit to taper in the direction of its length, so as to bring the broad part of the tooth at the front working end thereof; but this taper of the tooth is effected by widening or thickening the flanges or ribs in a manner to retain a uniform width between the opposing edges of the ribs or flanges for the purpose of causing said ribs or flanges to uniformly embrace or bear against the sides of the saw-blade.

The described construction of the tooth, the thickness of which tapers longitudinally, enables the same to be seated in the recess of the saw-blade without swaging or setting the parts in place. It is evident that as the tooth becomes worn through constant service it may be projected more or less beyond the peripheral edge of the saw-blade in order that the chisel edge and the preliminary cutters of the tooth may be presented at the proper angle to cut through the fibers of the wood with ease and certainty, thus obviating lost motion. The heel of the tooth is adapted to abut against an abrupt shoulder between the sides 3 and 4 of the recess; but when the tooth is adjusted the space between the heel of the tooth and this abrupt shoulder may be filled by a follower or block, as is common in the art.

The locking-block 6 is of eccentric form, and in one edge thereof is formed a V-shaped channel or groove to engage with the tongue on the side 4 of the recess. This groove or channel may or may not extend entirely around the eccentric locking-block; but I prefer to make that side of the locking-block which engages with the insertible tooth with a straight transverse edge or face. The neutral or concave face of the segmental tooth or bit is formed with a groove or channel 12 to receive the convex front edge of the locking-block.

In preparing my insertible tooth the working end thereof is beveled inwardly from the chisel edge and the preliminary cutters are sharpened exteriorly to the segmental outer face of the tooth or bit, thus causing the tooth to retain its proper contour and making it well adapted to cut a groove or kerf with parallel walls which are perpendicular to the bottom of the cut. To sharpen the tooth, it is only necessary to file the under or neutral side at the working end of the bit or tooth, thereby insuring the true and correct form to said tooth or bit.

A circular saw equipped with teeth or bits constructed in accordance with my invention is well adapted to cut either across or in line with the grain of the wood, and said teeth or bits may be used advantageously for cutting a groove or channel in a board. The saw may also be used to good advantage as a cut-off saw, and it is especially well adapted for use in grooving wood by forming longitudinal kerfs or channels therein. The tooth may be modified in its construction to adapt it for use in a dado-head.

In the practical operation of a saw of the class to which my invention relates it is not advisable to adjust the insertible tooth or bit beyond a point indicated by the radial line X in Fig. 1. Otherwise the cutting edge of the tooth will not be presented properly to the work to operate thereon with efficiency. For the purpose of determining the proper extent of adjustment of the tooth I have constructed the saw-blade with a series of apertures or sockets 14, each of which lies in a radial line drawn through the center of the saw-blade and the center of the eccentric locking-block 6.

In connection with the described construction of the blade and the locking-block I employ a gage 15 to indicate the limit of adjustment of the insertible tooth or bit when such adjustment becomes necessary by reason of the tooth becoming worn. The gage consists of a flat plate 16, preferably triangular in shape, a pin or stud 17 at one end thereof, and a pin or stud 18, attached to or integral with the plate near its outer end in a position to rest upon the edge of the saw-blade. To apply the gage to the saw-blade preliminary to adjusting the insertible tooth or bit therein, the plate is laid flat against one side of the blade in a position for its stud 17 to fit in the opening 14 of the saw-blade and the pin 18 to rest itself upon the edge of said saw-blade. Said studs hold the gage in position in the path of the bit or tooth which it is desired to adjust, and said bit or tooth may now be moved in the recess to bring its working edge in contact with the gage, which serves to limit the adjustment of the tooth to the proper position.

From the foregoing description, taken in connection with the drawings, it will be seen that the tooth tapers in its thickness, so that it is of varying cross-sectional thicknesses at different points, the effect of which is to make the inner and outer segmental faces of the tooth eccentric.

An inserted tooth constructed as before described is useful in relatively thin saw-blades for cutting off or ripping purposes; but when the same is used for cutting grooves or kerfs in the work I prefer to use the tooth shown by Figs. 7 and 8. In this style of tooth it is made considerably wider than the saw, as I have found a saw-blade one-fourth of an inch thick is strong enough to support a series of teeth each of which has a cutting edge three-fourths of an inch wide, more or less. The tooth 20 has the side flanges 21 extended to form the preliminary cutters and the groove 22 on one face to receive the locking-block; but in addition to these features the wide tooth is also formed with the channel-forming flanges 23, which are integral with the tooth and project from the same side or face thereof as the flanges 21. These flanges 23 are parallel to provide a channel of uniform width, which receives the edge of the blade, and said flanges embrace the blade to strengthen the joint between the blade and tooth. The formation of the additional flanges on the wide tooth lightens the tooth and renders it easier to file the working edge of the tooth, because it is only necessary to file the ribs instead of a thickness of metal between the side flanges and the outer channel when it is desired to sharpen the preliminary cutters at the working end of the tooth.

As will be noted by reference to Figs. 1 and 2, the locking-block is or may be provided with a central angular hole to receive a key or implement for tightening the block to lock the tooth in place.

It is evident that changes in the form and proportion of parts and in the details of construction may be made without departing from the spirit of the invention.

Having thus described the invention, what I claim as new, and desire to secure by Letters Patent, is—

1. An insertible saw-tooth, segmental in form, provided with a chisel edge at the outer curve of the segment and on the back of the tooth with side flanges or ribs which are spaced to form between themselves a groove or channel, said ribs or flanges projecting forwardly beyond the chisel edge of the tooth and forming the preliminary cutters, substantially as described.

2. An insertible tooth or bit of segmental form having its front working end beveled rearwardly and inwardly from a chisel edge which is at the outer curve of the segment, and preliminary cutters which extend as ribs along the back of the tooth and project forwardly beyond the transverse line of the chisel edge and are disposed on opposite sides of the same, whereby the cutters are adapted to enter and cut the wood in advance of the chisel edge, substantially as described.

3. An insertible saw-tooth, segmental in form, provided on its rear face and at the opposite side edges thereof with spaced longitudinal ribs or flanges which form between themselves a single longitudinal groove or channel which is uniform in width to fit and receive a saw-blade, said ribs or flanges projecting in advance of a chisel edge at the working end of said tooth and forming preliminary cutters as integral elements of the tooth or bit, substantially as described.

4. The combination with a saw-blade having a recess one side of which has a straight transverse edge, of an insertible segmental tooth or bit provided on its rear side with protruding longitudinal flanges or ribs which embrace the sides of the saw-blade and project at their front extremities in advance of a chisel edge at the working end of said tooth or bit, and means for locking the insertible tooth within its seat of the saw-blade, substantially as and for the purposes described.

5. An insertible tooth provided with a wide chisel edge at its working end, the preliminary cutters arranged at the back of the tooth and projecting forwardly beyond the chisel edge, and a channel or groove within the chisel edge and extending longitudinally of the insertible tooth, whereby the tooth is adapted to fit the edge of a saw-blade, substantially as described.

6. An insertible cutter or tooth having the wide continuous chisel edge at its working front end, the side flanges extending forwardly beyond the chisel edge and forming the preliminary cutters, and the ribs within said flanges and spaced relatively to each other to form between themselves a saw-receiving channel, substantially as described.

In testimony that I claim the foregoing as my own I have hereto affixed my signature in the presence of two witnesses.

JOHN H. JEWETT.

Witnesses:
HOLSEY B. MOULTON,
A. W. BLOWER.